(12) United States Patent
Liang (10) Patent No.: US 7,164,434 B2
(45) Date of Patent: Jan. 16, 2007

(54) LCD BASED IMAGING APPARATUS FOR PRINTING MULTIPLE FORMATS

(75) Inventor: Rongguang Liang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 827 days.

(21) Appl. No.: 10/269,305

(22) Filed: Oct. 11, 2002

(65) Prior Publication Data

US 2004/0070665 A1   Apr. 15, 2004

(51) Int. Cl.
*B41J 27/00* (2006.01)

(52) U.S. Cl. ................................. 347/244; 347/258

(58) Field of Classification Search ............... 347/1.16, 347/134, 144, 239–244, 255–258; 346/134; 358/1.2; 359/321, 204, 383, 392, 432; 348/347; 250/830; 349/25, 30
See application file for complete search history.

(56) References Cited

U.S. PATENT DOCUMENTS

| | | | | |
|---|---|---|---|---|
| 4,994,827 A | * | 2/1991 | Jamzadeh et al. .......... 347/116 |
| 5,018,807 A | * | 5/1991 | Shirota ........................ 359/204 |
| 5,061,049 A | | 10/1991 | Hornbeck .................... 359/224 |
| 5,325,137 A | | 6/1994 | Konno et al. ................. 353/63 |
| 5,521,748 A | * | 5/1996 | Sarraf ......................... 359/321 |
| 5,652,661 A | | 7/1997 | Gallipeau et al. ........... 358/302 |
| 5,743,610 A | | 4/1998 | Yajima et al. ................ 353/31 |
| 5,808,800 A | | 9/1998 | Handschy et al. .......... 359/630 |
| 6,130,740 A | | 10/2000 | DeClerck et al. ............. 355/18 |
| 6,618,070 B1 | * | 9/2003 | Fischer et al. .............. 347/239 |
| 6,628,316 B1 | * | 9/2003 | Spurr et al. ................. 346/134 |
| 6,862,108 B1 | * | 3/2005 | Kito ........................... 358/1.2 |
| 2001/0017702 A1 | | 8/2001 | Kito ........................... 358/1.2 |
| 2002/0080258 A1 | * | 6/2002 | Ohta ........................... 348/347 |

* cited by examiner

*Primary Examiner*—Hai Pham
(74) *Attorney, Agent, or Firm*—Nelson Adrian Blish (57) ABSTRACT

An imaging apparatus (10) adapted for imaging onto a photosensitive medium (160) in one of a number of selectable image formats. A telecentric print lens assembly (132) can be indexed to any one of a plurality of positions along the output optical axis for imaging in a specific format. The print lens assembly (132) can be manually indexed or can be moved by a focus mechanism (80) under the control of a control logic processor (24).

16 Claims, 7 Drawing Sheets

LCD BASED IMAGING APPARATUS FOR PRINTING MULTIPLE FORMATS

FIELD OF THE INVENTION

This invention generally relates to imaging apparatus using spatial light modulators and more particularly relates to an apparatus and method for printing onto a photosensitive medium in any one of a set of available output formats.

BACKGROUND OF THE INVENTION

Two-dimensional spatial light modulators are widely used in a range of imaging applications from projection of color images to printing of monochrome and color images onto photosensitive media. Because it forms a complete, two-dimensional image at one time without requiring mechanical movement, the spatial light modulator offers a number of advantages over other types of imaging devices, such as scanning lasers, for example.

A spatial light modulator can be considered essentially as a two-dimensional array of light-valve elements, each element corresponding to an image pixel. Each array element is separately addressable and digitally controlled to modulate light by transmitting (or reflecting) or by blocking transmission (or reflection) of incident light from a light source. There are two salient types of spatial light modulators that are being employed for forming images in projection and printing apparatus. The liquid crystal device (LCD) modulates an incident beam by selectively altering the polarization of light for each pixel. An LCD may be transmissive, operating by selectively transmitting the incident beam through individual array elements. Other types of LCD are reflective, selectively changing the polarization of a reflected beam at individual array elements. The second basic type of spatial light modulator currently in use is the digital micromirror device (DMD), as disclosed in U.S. Pat. No. 5,061,049. The DMD modulates by reflection of light at each individual pixel site.

Spatial light modulators were initially developed for display and digital projection applications. Examples include display apparatus such as those disclosed in U.S. Pat. No. 5,325,137 and in U.S. Pat. No. 5,743,610, and miniaturized image display, such as mounted within a helmet or supported by eyewear, as is disclosed in U.S. Pat. No. 5,808,800.

More recently, spatial light modulators have been used in printing apparatus, such as the area printer disclosed in U.S. Pat. No. 5,652,661. It is instructive to consider some of the more important differences between projection and printing requirements for spatial light modulator devices. Effective image projection requires that the image forming device provide high levels of brightness. In display presentation, the human eye is relatively insensitive to many types of image artifacts and aberrations, since the displayed image is continually refreshed and is viewed from a distance. Motion and change also help to minimize the effects of many types of image artifacts. High resolution is not a concern for projection applications, with 72 pixels per inch normally satisfactory for many types of images.

Image printing, meanwhile, presents a number of different problems. For example, when viewing output from a high-resolution printing system, the human eye is not nearly as "forgiving" to artifacts, aberrations, and non-uniformity, since irregularities in optical response are more readily visible and objectionable on printed output. To obtain sufficiently high resolution, print output at 1200 dpi or higher may be necessary, depending on the application.

Conventional printing apparatus match system and optics to one type of photosensitive medium and to one image size format. For example, a particular printer may be designed to print standard 3.5×5 inch or 4×6 inch photographic prints. This is, in part, due to constraints imposed by conventional optical imaging methods that use film negatives. In order to provide acceptable throughput performance with conventional systems, it is necessary to fix the optical focus position, the position and aspect ratio of the negative, and the location of paper at the exposure plane. Thus, it is difficult to adapt conventional printing apparatus optics for providing, on a photosensitive medium, prints having more than one format. At the same time, however, spatial light modulators are not under similar constraints; it is possible to form two-dimensional images having, in units of pixels, a selectable number of rows and columns, thereby allowing a single spatial light modulator to form images in different aspect ratios.

Zoom lenses are one type of conventional optical solution that allows a single printing apparatus to provide output images in multiple output formats. However, such a solution is costly and requires either time-consuming manual focus adjustment for switching between output size formats or a complex motor assembly for automatic focus adjustment.

Thus, it can be seen that there would be advantages to a spatial light modulator-based imaging system that prints, onto a photosensitive medium, images in a selectable number of output size formats, with an optical system that easily adjusts between output size formats.

SUMMARY OF THE INVENTION

It is an object of the present invention to provide an imaging apparatus for printing onto a photosensitive medium in multiple output size formats. With this object in mind, the present invention provides an imaging apparatus for printing an image from digital data onto a photosensitive medium in one of a plurality of image formats, the apparatus comprising:

(a) a light source for providing a source light beam;

(b) a control logic processor for formatting the digital data according to the one of the plurality of image formats to provide formatted image data;

(c) a spatial light modulator for modulating the source light beam according to the formatted image data in order to form an exposure image; and (d) a telecentric imaging optics assembly disposed along the output axis at one of a set of predetermined positions according to one of the plurality of image formats, for directing the exposure image onto the photosensitive medium.

From another aspect, the present invention provides a method for printing an image from digital data onto a photosensitive medium in a selected format of a plurality of image formats, the method comprising:

(a) positioning a telecentric imaging optics assembly along the output axis at a position corresponding to the selected format;

(b) forming, on a spatial light modulator, an exposure image having the selected format by modulating a light source according to the digital data; and (c) directing the exposure image through the telecentric imaging optics assembly onto the photosensitive medium.

It is a feature of the present invention that it provides a telecentric imaging optics assembly that can be indexed to an appropriate position along the optical axis in order to be suitable for any one of a set of predetermined output size formats.

It is an advantage of the present invention that it provides an optical apparatus for an imaging device that requires no internal focus adjustment in order to switch between providing one output format and another. A complete optical assembly can simply be moved along the output axis, as a unit, and be positioned in place for the desired output format.

It is a further advantage of the present invention that it offers the option of manual adjustment or simple automated adjustment of the position of imaging optics. The telecentric design of the imaging optics helps to maintain exposure uniformity on the photosensitive medium surface.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
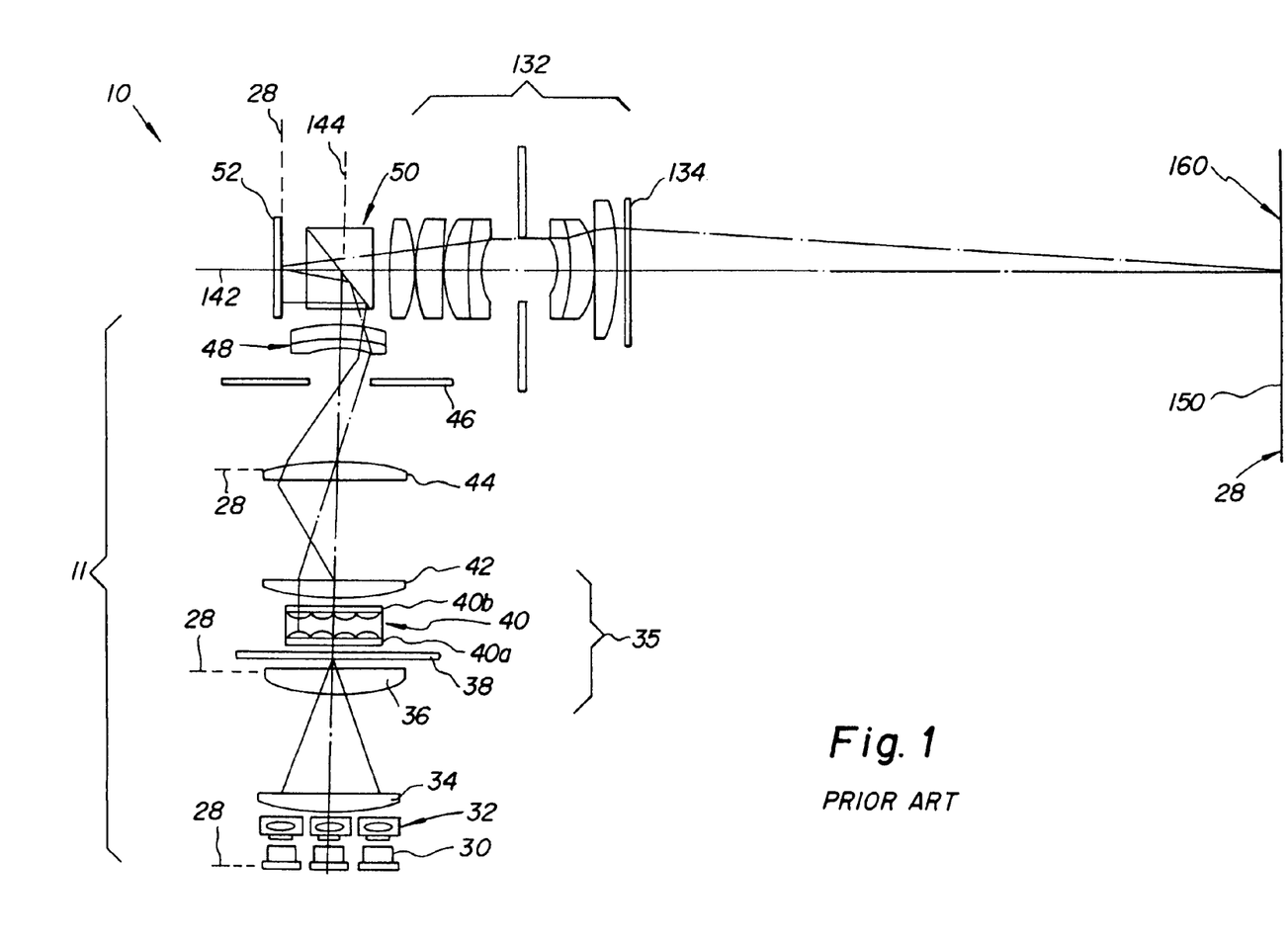
FIG. 1 is a schematic block diagram showing a prior art imaging apparatus for forming an image onto photosensitive media using a reflective spatial light modulator.

Referring to FIG. 1, there is shown, in block diagram form, a prior art imaging apparatus 10 that uses a reflective LCD as a spatial light modulator 52. Because the apparatus of the present invention is an improvement upon existing systems, it is beneficial to first describe this prior art imaging apparatus 10 in some detail. As an overview, illumination optics 11 provides source illumination, normally one color at a time, which is directed to spatial light modulator 52 by means of a polarizing beamsplitter 50. A print lens assembly 132 then directs the modulated light as a two-dimensional image onto a photosensitive medium 160 at an image plane 150. Conjugate planes 28 are indicated for reference at various points in the optical system shown in FIG. 1.

Within illumination optics 11, a light source 30 provides each color needed. The arrangement of FIG. 1 shows one or more LEDs as light source 30, where each LED is operated in pulsed, color sequential manner. Each light source 30 has a collimating lens 32. A combiner field lens 34 directs this collimated light to an integrator assembly 35 which acts as a uniformizer, homogenizing the source illumination. In the implementation shown in FIG. 1, integrator assembly 35 comprises field lenses 36 and 42 and a lenslet array assembly 40. A linear polarizer 38 is positioned to provide the proper polarization state for illumination optics 11. Lenslet array assembly 40 includes a first lenslet array 40a and a second lenslet array 40b. With this arrangement, the light is broken up into a number of portions, equivalent to the number of elements in first lenslet array 40a. The individual portions are then imaged and magnified by second lenslet array 40b and field lens 42. The light from integrator assembly 35 is then directed through a field lens 44 and through an aperture stop 46 to a relay lens 48. Relay lens 48 then directs the illumination through polarizing beamsplitter 50 to spatial light modulator 52. Light incident to spatial light modulator 52 has an s-polarization state 142. Light modulated by spatial light modulator 52 for exposure has a p-polarization state 144. A polarizer 134 acts as a polarization analyzer to improve the contrast of print lens assembly 132 output.

Figure 2A:
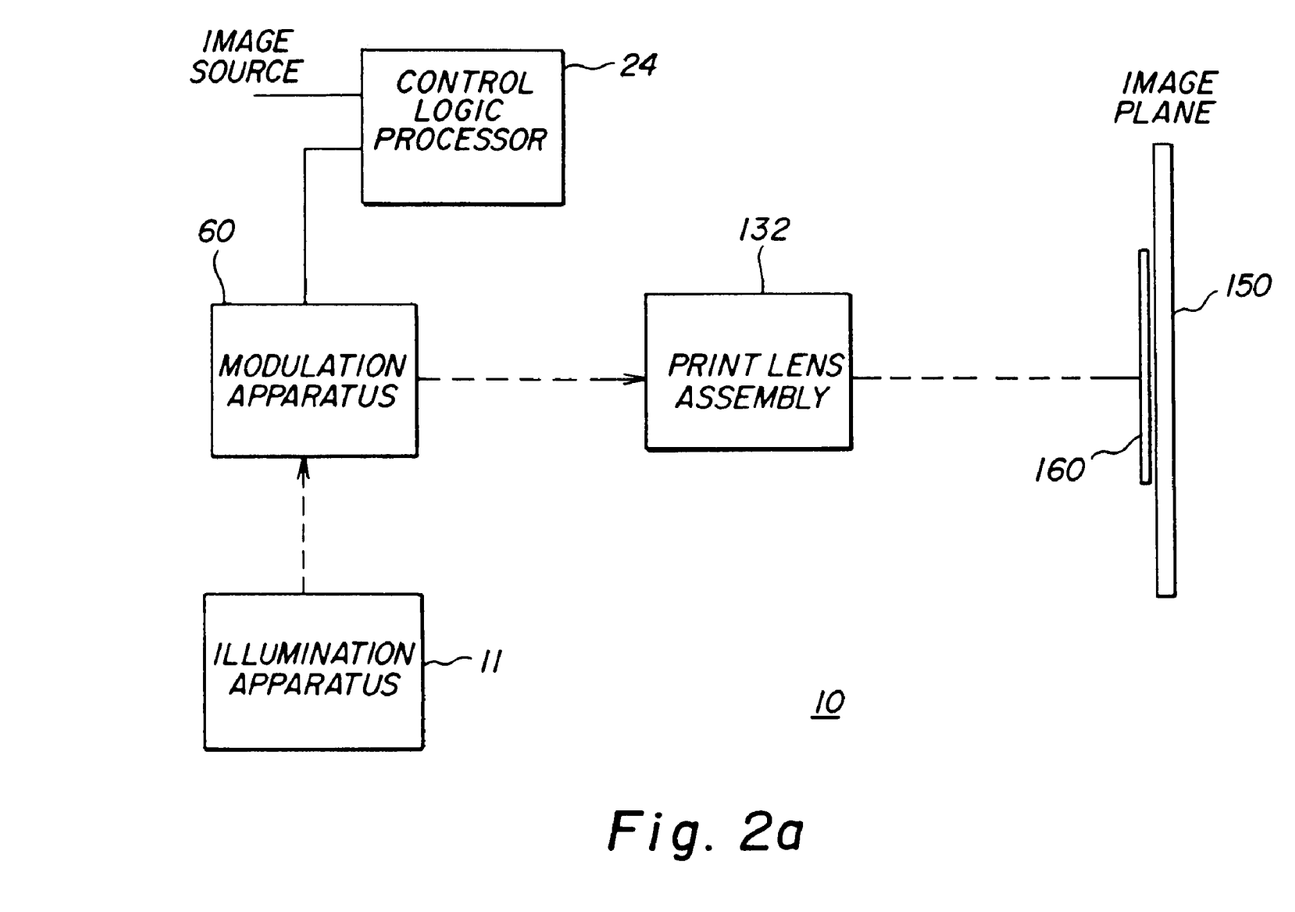
FIG. 2a is a simplified schematic block diagram showing the relationship of control logic components to the image forming and focusing components.

Referring to FIG. 2a, there is shown a block diagram of the major optical components shown in the arrangement of FIG. 1 and also used in a preferred embodiment of the present invention. In this schematic block diagram, imaging apparatus 10 comprises illumination optics 11, modulation apparatus 60, and print lens assembly 132 for forming an image onto photosensitive medium 160 at image plane 150. A control logic processor 24 provides image forming and control logic to modulation apparatus 60, which comprises spatial light modulator 52 (as shown in FIG. 1). Among the functions of control logic processor 24 is the dimensioning of the image that is to be printed as an array of rows and columns of pixels. Each output format may require a different number of pixels in each dimension.

Figure 5A:
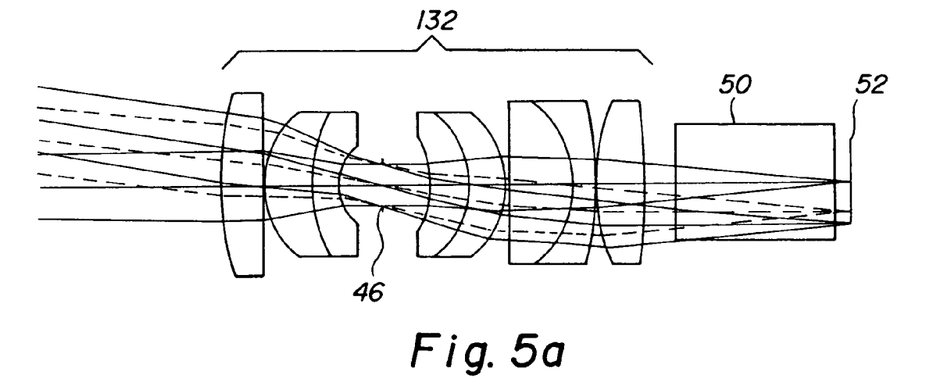
FIGS. 5a and 5b show alternative configurations for imaging optics.
Figure 5B:
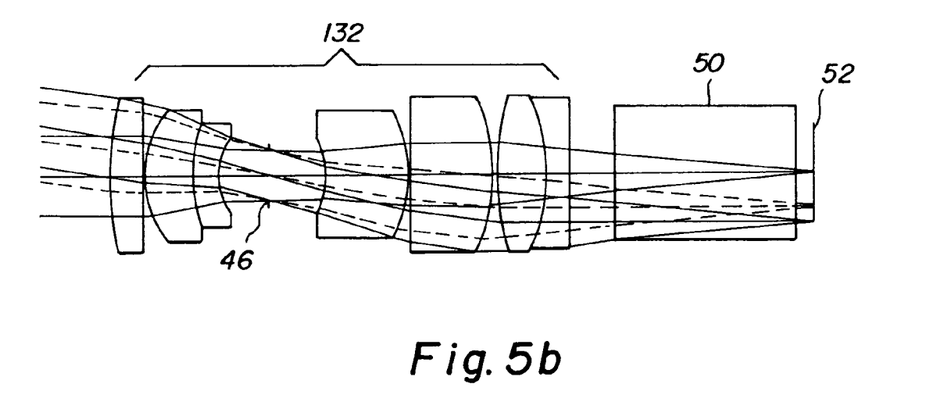

Referring to FIG. 5a, there is shown a preferred embodiment of print lens assembly 132 having eight elements. Referring to FIG. 5b, there is shown an alternate embodiment of print lens assembly 132 having seven elements. Print lens assembly 132 as shown in both FIGS. 5a and 5b is telecentric and includes internal aperture stop 46. Telecentricity is advantageous for providing image uniformity. Radius R, refractive indices $n_d$ and Abbe numbers $v_d$ for the lens, and the axial thickness and air spacings of the lenses for the preferred embodiments of 5a and 5b are listed in the tables below.

| | Embodiment 5a | | |
|---|---|---|---|
| Surf | Radius | Thickness | Glass |
| 1 | Infinity | 526.442 | |
| | | (720.858, 1100.0) | |
| 2 | 59.3125 | 8.5 | n = 1.72003, v = 50.62 |
| 3 | Infinity | 0.1 | |
| 4 | 19.5996 | 10.0 | n = 1.58913, v = 61.27 |
| 5 | 52.5232 | 5.0 | n = 1.64769, v = 33.85 |
| 6 | 9.9342 | 6.5 | |
| STO | Infinity | 9.85 | |
| 8 | −21.3996 | 8.0 | n = 1.78472, v = 25.76 |
| 9 | −20.2690 | 7.0 | n = 1.58913, v = 61.27 |

-continued

| | | | |
|---|---|---|---|
| 10 | −18.9132 | 0.1 | |
| 11 | Infinity | 13.0 | n = 1.58913, v = 61.27 |
| 12 | −22.6923 | 4.5 | n = 1.78472, v = 25.76 |
| 13 | −75.7138 | 0.1 | |
| 14 | 36.5769 | 9.5 | n = 1.58913, v= 61.27 |
| 15 | Infinity | 5.0 | |
| 16 | Infinity | 25.4 | n = 1.64769, v= 33.85 |
| 17 | Infinity | 4.581 | |
| | | (3.281, 2.009) | |
| IMA | Infinity | | |

Embodiment 5b

| Surf | Radius (mm) | Thickness (mm) | Glass |
|---|---|---|---|
| 1 | Infinity | 536.766 | |
| | | (716.120, 1100.176) | |
| 2 | 57.479 | 3.98 | n = 1.62209, v = 56.7 |
| 3 | Infinity | 0.25 | |
| 4 | 19.279 | 9.2 | n = 1.62209, v = 56.7 |
| 5 | 57.931 | 4.55 | n = 1.64766, v = 33.9 |
| 6 | 11.55 | 3.06 | |
| STO | Infinity | 14.05 | |
| 8 | −14.6 | 12.89 | n = 1.60881, v = 58.8 |
| 9 | −24.034 | 0.31 | |
| 10 | −199.97 | 5.98 | n = 1.62041, v = 60.3 |
| 11 | −28.426 | 0.25 | |
| 12 | 40.657 | 7.85 | n = 1.56888, v = 63.0 |
| 13 | −40.657 | 4.33 | n = 1.75524, v = 27.5 |
| 14 | Infinity | 6.59 | |
| 15 | Infinity | 25.4 | n = 1.64766, v = 33.9 |
| 16 | Infinity | 4.553 | |
| | | (3.351, 2.077) | |
| IMA | Infinity | | |

Unlike prior art print lens assembly 132 of FIG. 1, however, print lens assembly 132 as shown in FIGS. 5a and 5b is suitable for printing in multiple formats. That is, by adjusting the placement position of print lens assembly 132 along an output optical axis O as shown in FIGS. 3a–3d, any of three different output formats can be printed at image plane 150. In the preferred embodiment, print lens assembly 132 components are positionally fixed relative to each other. Alternate arrangements are possible for allowing focus adjustment of individual components of print lens assembly 132, however, employing any type of focus mechanism within print lens assembly 132 would diminish the ease of adaptation to different output formats that the preferred embodiment offers.

Figure 3A:
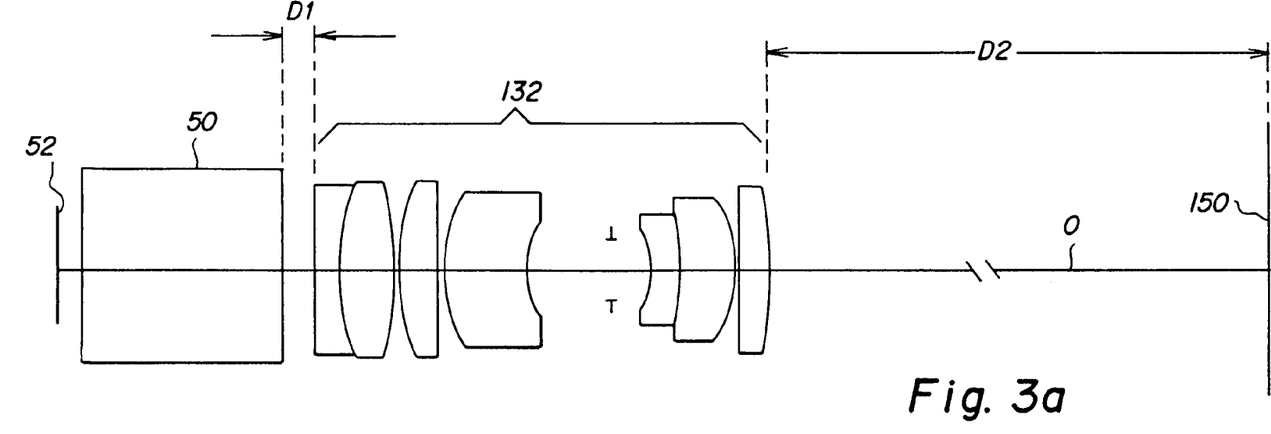
FIGS. 3a–3d show different positions for placement of imaging optics along the optical axis to be suitable for different output formats.
Figure 3B:
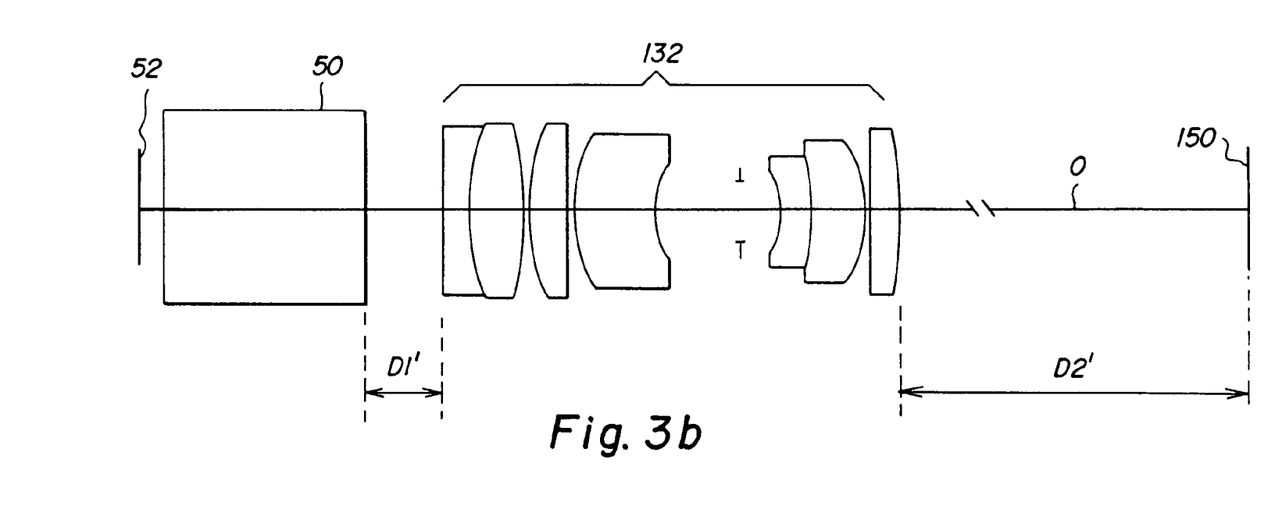
Figure 3C:
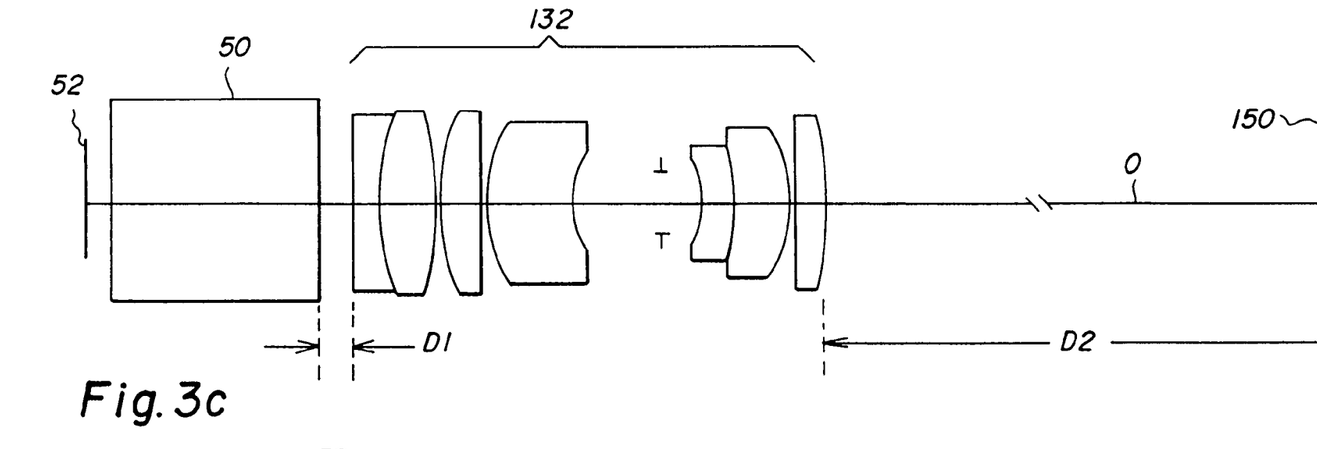
Figure 3D:
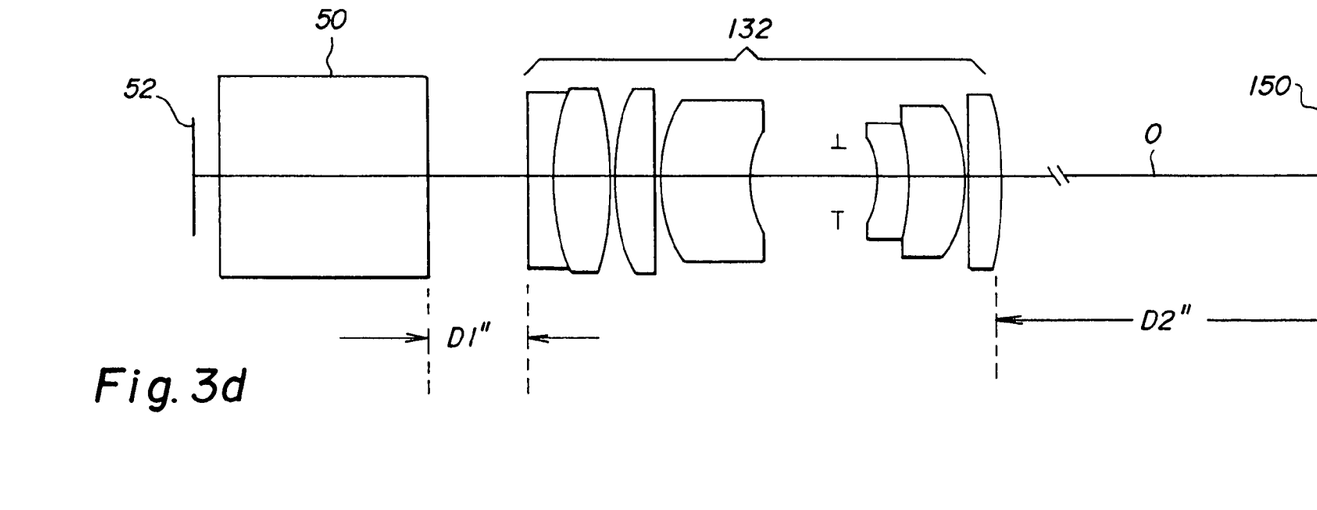

Referring first to FIGS. 3a and 3b, there are shown two alternate placements for print lens assembly 132 as it would be moved along optical axis O. Distances D1 and D2 in FIG. 3a show an initial position for print lens assembly 132 when deployed for printing in 4×6 inch format, for example. By indexing print lens assembly 132 forward, as shown in FIG. 3b, distances D1 and D2 are changed to D1' and D2' respectively. With this adjustment, an alternate output format is available, for example, 6×4 inch format. Referring next to FIGS. 3c and 3d, there is shown another alternate shift of positions for print lens assembly 132. FIG. 3c shows an initial position, again for 4×6 inch format. FIG. 3d shows the alternate position of print lens assembly 132 when moved along output axis O for 8×12 inch format. Similarly, in the sequence of FIGS. 3c and 3d, distances D1 and D2 are changed to D1" and D2" respectively.

Figure 2B:
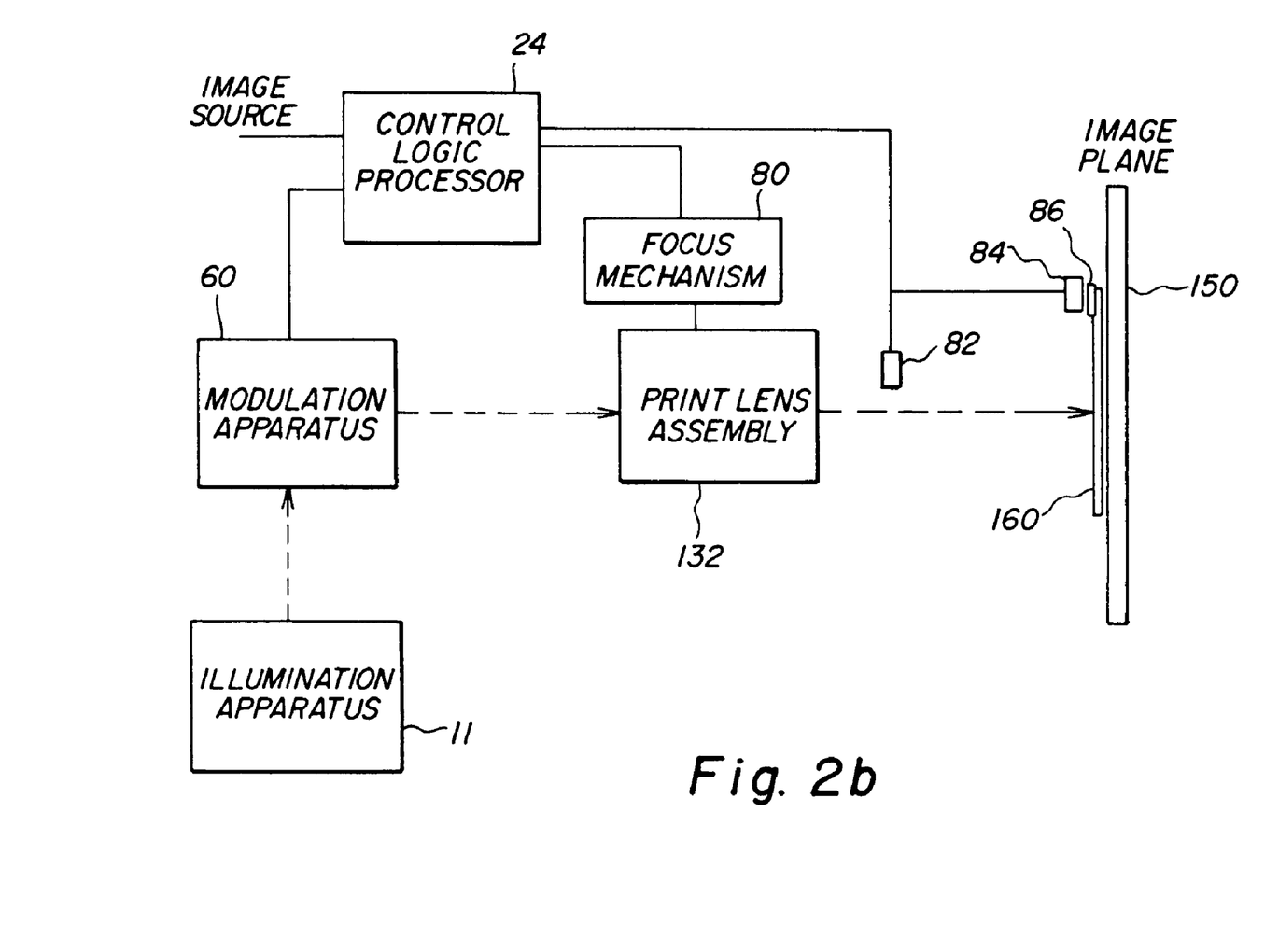
FIG. 2b is a simplified schematic block diagram showing added control of a focus mechanism.
Figure 4A:
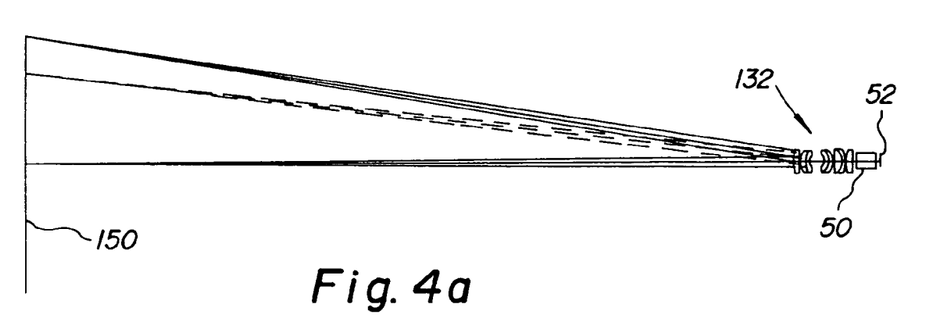
FIGS. 4a–4c show ray diagram views of imaging optics at different positions along the optical axis for different output formats.
Figure 4B:
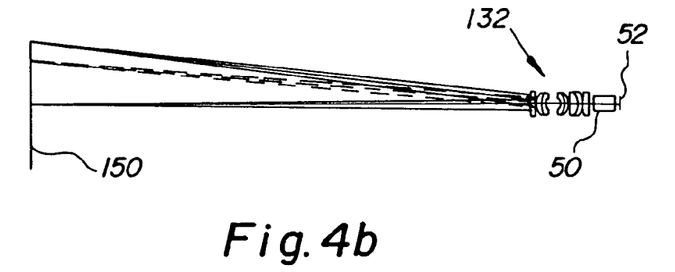
Figure 4C:
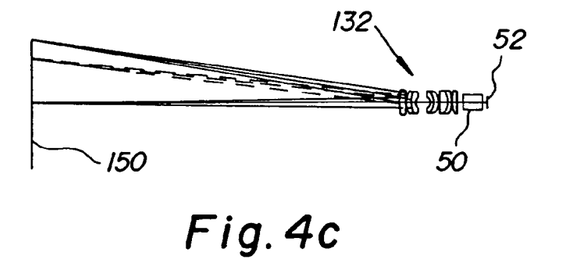

Referring to FIGS. 4a–4c, there are shown principal and representative auxiliary rays for each of 8×12 inch, 6×4 inch, and 4×6 inch formats respectively. Referring back to FIG. 2a, print lens assembly 132 can be manually indexed to any of the print format positions for which rays are represented in FIGS. 4a–4c. In turn, control logic processor 24 appropriately formats the image that is formed by modulation apparatus 60 to suit the same print format. Control logic processor 24 accepts input image data from an image source (not shown), formats the image as an array of rows and columns of pixels, dimensioned according to the output format, and provides output modulation data to spatial light modulator 52. In addition, control logic processor 24 may also control the bias voltage provided to spatial light modulator 52. Alternately, as shown in FIG. 2b, a focus mechanism 80 can be controlled by control logic processor 24 to mechanically index print lens assembly 132 from one position to another. Focus mechanism 80 could be, for example, a stepper motor adapted for automatic focus position adjustment using techniques well known in the imaging arts. A sensor 82 could be deployed to verify that focus mechanism 80 is in proper position for imaging at the correct format. Another sensor 84 could be used to sense an indicator 86 coupled to photosensitive medium 160 that indicates the preferred image format. Depending on the type of indicator 86, sensor 84 could be an optical sensor or a mechanical, magnetic, electromagnetic, acoustical, or RF sensor, for example.

It must be noted that the method and apparatus of the present invention apply to modulation apparatus 60 using a broad range of image modulator types as spatial light modulator 52, including either reflective or transmissive modulator types. Other image modulation methods could be employed within modulation apparatus 60, providing linear image modulation, such as with linear light valve devices, or raster image modulation, such as with lasers and spinning polygons. However, in a preferred embodiment, modulation apparatus 60 uses a reflective spatial light modulator 52, following the basic model of FIGS. 1, 2a, and 2b. Notably, the implementation of the method and apparatus of the present invention could be equally applied to modulation apparatus 60 using transmissive spatial light modulators 52, using techniques familiar to those skilled in the imaging arts.

It must be emphasized that the architecture of imaging apparatus 10 shown in FIGS. 1, 2a, and 2b is broadly generalized and admits a number of different embodiments and additions. For example, light source 30 and accompanying integrator assembly 35 can take any of a number of forms. Illumination could be provided in separate colors, such as using individual LEDs or LED arrays. Light source 30 could also be provided by one or more lasers, depending on the type of imaging apparatus 10. Integrator assembly 35 could alternately comprise an integrating bar or integrating tunnel. Control logic processor 24 can be embodied in a number of ways, such as using a microcomputer or a dedicated microprocessor and support memory and logic circuitry. Look-Up-Tables (LUTs) may be provided to spatial light modulator 52 to control response for each type of light source 30. Multiple spatial light modulators 52 could be employed, such as using one spatial light modulator 52 for each color for example, with colors combined along a single output path, such as using a dichroic combiner, X-prism, or Philips prism, and focused through print lens assembly 132. Photosensitive medium 160 could be any of a number of types of film, paper, or other transparent or opaque materials that respond to exposure energy.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. Thus, what is provided is an imaging apparatus and method for printing onto a photosensitive medium in a plurality of output formats.

PARTS LIST

| | |
|---|---|
| 10 | Imaging apparatus |
| 11 | Illumination optics |
| 24 | Control logic processor |
| 28 | Conjugate plane |
| 30 | Light source |
| 32 | Collimating lens |
| 34 | Combiner field lens |
| 35 | Integrator assembly |
| 36 | Field lens |
| 38 | Linear polarizer |
| 40 | Lenslet array assembly |
| 40a | First lenslet array |
| 40b | Second lenslet array |
| 42 | Field lens |
| 44 | Field lens |
| 46 | Aperture stop |
| 48 | Relay lens |
| 50 | Polarizing beamsplitter |
| 52 | Spatial light modulator |
| 60 | Modulation apparatus |
| 80 | Focus mechanism |
| 82 | Sensor |
| 84 | Sensor |
| 86 | Indicator |
| 132 | Print lens assembly |
| 134 | Polarizer |
| 142 | S-polarization state |
| 144 | P-polarization state |
| 150 | Image plane |
| 160 | Photosensitive medium |

What is claimed is:

1. An imaging apparatus for printing an image from digital data onto a photosensitive medium in one of a plurality of image formats, the apparatus comprising:
   (a) a light source for providing a source light beam;
   (b) a control logic processor for formatting the digital data according to said one of said plurality of image formats to provide formatted image data;
   (c) a spatial light modulator for modulating said source light beam according to said formatted image data in order to form an exposure image;
   (d) a telecentric imaging optics assembly disposed along the output axis at one of a set of predetermined positions according to said one of said plurality of image formats, for directing said exposure image onto the photosensitive medium;
   (e) wherein a first relative distance between said spatial light modulator and said telecentric imaging optics is changed for each of said predetermined positions; and
   (f) wherein a second relative distance between said spatial light modulator and said photosensitive medium is changed for each of said predetermined positions.

2. An imaging apparatus according to claim 1 wherein said light source comprises a filter.

3. An imaging apparatus according to claim 1 wherein said light source is selected from the group consisting of lamp, LED, and laser.

4. An imaging apparatus according to claim 1 wherein said light source comprises a uniformizer for homogenizing said source light beam.

5. An imaging apparatus according to claim 4 wherein said uniformizer is selected from the group consisting of integrating bar, integrating tunnel, and lenslet array.

6. An imaging apparatus according to claim 1 wherein said one of said plurality of image formats is taken from the set comprised of 4×6inch, 6×4inch, and 8×12inch format.

7. An imaging apparatus according to claim 1 wherein said spatial light modulator is selected from the set consisting of reflective LCD, transmissive LCD, and DMD.

8. An imaging apparatus according to claim 1 further comprising:
   a focus mechanism for moving, according to a command from said control logic processor, said telecentric imaging optics assembly to said one of said plurality of predetermined positions.

9. An imaging apparatus according to claim 1 further comprising:
   a position sensor for indicating the position of said telecentric imaging optics assembly along the optical axis.

10. An imaging apparatus according to claim 9 wherein said position sensor communicates with said control logic processor.

11. An imaging apparatus according to claim 1 further comprising:
   a type sensor for indicating the type of said photosensitive medium.

12. An imaging apparatus according to claim 11 wherein said type sensor communicates with said control logic processor.

13. An imaging apparatus according to claim 11 wherein said type sensor is taken from the group consisting of optical, mechanical, electromagnetic, acoustic, and RF sensor.

14. An imaging apparatus according to claim 1 wherein said telecentric imaging optics assembly further comprises an adjustable focusing mechanism.

15. An imaging apparatus according to claim 1 wherein said photosensitive medium is film.

16. An imaging apparatus according to claim 1 wherein said photosensitive medium is opaque.

* * * * *